United States Patent Office 2,839,519
Patented June 17, 1958

2,839,519

ETHYLENE POLYMERIZATION

Leslie Seed, Northwich, England, assignor to Imperial Chemical Industries Limited, London, England, a corporation of Great Britain No Drawing. Application February 28, 1956
Serial No. 568,172

Claims priority, application Great Britain
January 16, 1957

7 Claims. (Cl. 260—94.9)

This invention relates to a continuous process for making solid polymers from ethylene by polymerizing it under superatmospheric pressures and at elevated temperatures, particularly polymers that are of higher density and stiffness than those that have commonly been made hitherto by such a process.

It is known that solid polymers of ethylene can be obtained by subjecting ethylene and a suitable catalyst to temperatures in the range of about 50°–400° C. and to pressures above about 500 atmospheres. Many catalysts have been proposed for such reactions e. g. oxygen, per-salts, organic peroxides, metal alkyls and azo compounds, and with some of these, particularly per-salts and peroxides, it is often preferable to carry out the polymerization in presence of an inert liquid medium e. g. water or benzene. The polymers made by most of these known processes constitute the polythenes of commerce as generally hitherto understood, and though these polymers can never be unequivocally defined in terms of a single molecular weight or some other property since they are, like most polymeric materials, mixtures of several individuals possessing different molecular weights and different physical properties, they do in general have densities less than 0.925 gm./cc. There is however a growing interest in polythenes of higher density than 0.925 since such polymers possess greater mechanical stiffness, as measured for example by bending modulus determinations, and are accordingly useful for making into objects requiring greater rigidity.

Polythenes having densities greater than 0.925 gm./cc. are known and some of them have been made by polymerizing ethylene in processes requiring high pressures, but these processes have also required the presence of liquid reaction media for successful results to be achieved. For example a process is known which, when carried out in an aqueous-organic or aqueous reaction medium, at pressures of 1200–2000 atmospheres and temperatures of 120°–300° C. and in the presence of cyclohexane to control the chain growth, yields polymers having densities in the range 0.925–0.930.

It is the principal object of the present invention to provide a "dry" polymerization process, that is to say one that does not depend for results on the presence of a liquid reaction medium, whereby ethylene under the action of high pressures and moderately elevated temperatures yields solid, stiff and tough polythenes having densities greater than 0.925 gm./cc.

According to our invention we provide a continuous process for making solid, stiff and tough polymers of ethylene having densities greater than 0.925 gm./cc. that comprises subjecting ethylene to a temperature below 150° C. and to a pressure above 500 atmospheres, in the presence of a free radical-producing ethylene polymerization catalyst and from 0.01% to 5.0% by weight of the ethylene of a chain-transfer agent, for example hydrogen, carbon tetrachloride or chloroform.

We prefer to operate at pressures above 1250 atmospheres, for example 1500 atmospheres; the highest desirable pressures are about 2000 atmospheres.

The choice of a preferred temperature range is influenced by the facts that the higher the temperature the higher is the rate of chain initiation but, for a given catalyst, the lower is the density and stiffness of the polymer. The higher the reactivity of the catalyst the lower is the temperature at which one can operate at a given rate and the higher the density and stiffness of the polymer. Thus choice of catalyst goes hand in hand with choice of temperature, and it is one of the main features of the invention to have discovered those combinations of catalyst, proportion of chain transfer agent, temperature and pressure that lead to the production of solid ethylene polymers having density and stiffness greater than have polymers made hitherto in a "dry" high pressure process. Very suitable combinations are temperatures of 55°–110° C. with catalysts consisting of peroxydicarbonate esters for example di-isopropyl peroxydicarbonate

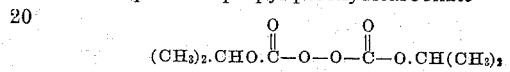

and di-iso-amyl peroxydicarbonate. Other suitable combinations include alkyl and aryl hyponitrites, for example methyl, ethyl, isobutyl and benzyl hyponitrites at temperatures of 15°–50° C. Yet another suitable combination includes α-substituted acyl peroxides, for example di-isobutyryl peroxide and di-pivalyl peroxide at temperatures of 20°–60° C. Suitable proportions of these catalysts are in the range 5–100 parts per million parts of ethylene; useful results are often obtained with as low a proportion as 10 parts per million. Many of the peroxy compounds known to be efficient catalysts in the known processes for polymerizing ethylene under high pressure to give the polyethylenes known hitherto are insufficiently reactive in the process of our invention. Among such peroxy compounds are benzoyl peroxide, di-tertiary butyl peroxide, lauroyl peroxide.

Oxygen itself is not a catalyst for the reactions covered by our invention; on the contrary, in amounts greater than about 5 parts per million it interferes with the action of the catalyst under the conditions of our process, and consequently the ethylene fed to the reaction vessel preferably contains less than about 5 parts per million by weight.

A suitable proportion for the chain-transfer agent, hydrogen, is 0.5–2.5% by volume of the ethylene measured at atmospheric pressure. It is known to polymerize mixtures of ethylene and up to 10% by weight of hydrogen at pressures of 1000 atmospheres and less, and at elevated temperatures in the presence of water and/or benzene, and with oxygen as catalyst in order to obtain soft, paste-like waxes; and with benzoyl peroxide as catalyst, and in the absence of a liquid medium, to obtain a hard, brittle wax of relatively low molecular weight, but none of these products is a solid, tough and stiff polymer of ethylene having a density greater than 0.925, and the present invention is not concerned with such reactions.

A suitable proportion for the chain-transfer agents carbon tetrachloride and chloroform is 0.05–1.0% by weight of the ethylene. It is sometimes convenient to use a mixture of carbon tetrachloride and chloroform to prevent freezing of the former when being introduced into the reaction vessel.

Other chain-transfer agents may be used in the process of our invention, for example hexachlorethane; saturated halogenated carboxylic acids and their esters, for example dichloracetic acid and its ethyl ester; aldehydes, for example acetaldehyde; alkyl esters of inorganic oxyacids of sulfur, phosphorus or silicon, for example diethyl sulphite, triethyl orthophosphate and tetrabutyl orthosilicate respectively; and mercaptans, for example dodecyl mercaptan.

The invention is illustrated but not restricted by the following examples.

Example 1

Ethylene containing less than 5 parts per million of oxygen was mixed with 2.5% by volume of hydrogen and the mixture compressed to a pressure of 1250 atmospheres and admitted together with 10 parts per million of di-isopropyl peroxy dicarbonate as catalyst to a pressure vessel fitted with a stirrer, means for controlling the temperature, and suitable inlets and outlets to allow the continuous introduction of reactants and continuous discharge of products. The temperature of the ingoing ethylene was 25° C. and that inside the steel vessel was maintained at 75°–90° C. The contact time within the vessel was about 10 minutes and the ethylene/polythene conversion achieved was about 8.3%. A solid polymer of ethylene was continuously produced having the following properties:

| | |
|---|---|
| Density _____gm./cc__ | 0.947 |
| Bending modulus_____lbs./sq. inch__ | 70,000 |
| Grade number (B. S. Specification No. 1972) (melt index)_____ | 0.9 |

Example 2

The operating conditions were similar to those in Example 1 except that the pressure was 1400 atmospheres and the temperature 50°–60° C. The conversion achieved was about 8.0% and the polymer had the following properties:

| | |
|---|---|
| Density _____gm./cc__ | 0.950 |
| Bending modulus_____lbs./sq. inch__ | 82,000 |
| Grade number (melt index)_____ | 0.3 |

Example 3

The operating conditions were similar to those in Example 1 except that the proportion of hydrogen was 1.5% by volume of the ethylene. The conversion achieved was about 9.0% and the polymer had the following properties:

| | |
|---|---|
| Density _____gm./cc__ | 0.944 |
| Bending modulus_____lbs./sq. inch__ | 65,000 |
| Grade number (melt index)_____ | 0.02 |

Example 4

In a similar experiment to the three foregoing, the pressure was 2000 atmospheres, the temperature 50°–60° C., and the proportion of hydrogen 2.5% by volume of the ethylene. The conversion achieved was about 8.2% and the polymer had the following properties:

| | |
|---|---|
| Density _____gm./cc__ | 0.960 |
| Bending modulus_____lbs./sq. inch__ | 93,000 |
| Grade number (melt index)_____ | 0.1 |

Example 5

In a similar experiment to that described in Example 1 but using carbon tetrachloride instead of hydrogen as chain-transfer agent, in a proportion of 0.08% by weight of the ethylene, the reaction pressure was 1250 atmospheres and the temperature 90°–95° C. The conversion achieved was about 10% and a solid polymer of ethylene was produced having the following properties:

| | |
|---|---|
| Density _____gm./cc__ | 0.941 |
| Bending modulus_____lbs./sq. inch__ | 60,000 |
| Grade number (melt index)_____ | 1.0 |
| Vicat softening point_____° C__ | 117 |

Example 6

The experiment described in Example 1 was repeated but with di-isoamyl peroxydicarbonate as catalyst in place of di-isopropyl peroxydicarbonate. The solid polymer of ethylene obtained had the following properties:

| | |
|---|---|
| Density _____gm./cc__ | 0.948 |
| Bending modulus_____lbs./sq. inch__ | 70,000 |
| Grade number (melt index)_____ | 0.90 |

Example 7

The experiment described in Example 5 was repeated but with di-isoamyl peroxydicarbonate as catalyst in place of di-isopropyl peroxydicarbonate. The solid polymer of ethylene obtained had the following properties:

| | |
|---|---|
| Density _____gm./cc__ | 0.940 |
| Bending modulus_____lbs./sq. inch | 60,000 |
| Grade number (melt index) _____ | 1.0 |
| Vicat softening point_____° C__ | 116 |

Example 8

Into a high-pressure reaction vessel cooled to below 0° C. was introduced 0.5 parts by weight of a solution containing 5.2 parts of di-isobutyryl peroxide in 100 parts by weight of pentane. This was sufficient to amount to about 15 parts per million of ethylene in the reacion. The vessel was closed and the air in it removed by repeatedly purging with ethylene containing less than 5 parts per million of oxygen. Ethylene containing 2.0% by volume of hydrogen was then compressed into the vessel up to 1400 atmospheres, the vessel being at the same time heated up to 50° C. and maintained at that temperature as closely as possible. After the pressure had fallen by about 100 atmospheres over 20 minutes the vessel was opened and 5 parts of a white solid polyethylene extracted, which was found to have the following properties:

| | |
|---|---|
| Density _____gm./cc__ | 0.949 |
| Yield stress_____lbs./sq. inch__ | 3045 |
| Bending modulus_____lbs./sq. inch__ | 79,000 |
| Grade number (melt index)_____ | 0.68 |

Example 9

In a similar experiment to that described in Example 8 di-pivalyl peroxide (bis-trimethyl acetyl peroxide) was used as catalyst instead of di-isobutyryl peroxide, the reaction pressure was 1000 atmospheres and the temperature 20° C. The solid polymer produced had the following properties:

| | |
|---|---|
| Density _____gm./cc__ | 0.942 |
| Yield stress_____lbs./sq. inch__ | 3900 |
| Bending modulus_____lbs./sq. inch__ | 62,000 |
| Grade number (melt index)_____ | 0.80 |

Example 10

In this experiment conditions were the same as those in Example 9 except that as chain-transfer agent carbon tetrachloride was used in place of hydrogen; the proportion was about 0.10% by weight of the ethylene. The solid polymer produced had the following properties:

| | |
|---|---|
| Density _____gm./cc__ | 0.950 |
| Bending modulus_____lbs./sq. inch__ | 80,000 |
| Grade number (melt index)_____ | 0.70 |

Example 11

To a stainless steel autoclave is added 0.25 part by weight of a solution containing 5 parts of ethyl hyponitrite in 100 parts of petroleum ether (60°–80° C.). This was sufficient to amount to about 15 parts per million of ethylene in the reaction. After purging the autoclave of air ethylene containing 2.0% by volume of hydrogen was compressed into the autoclave up to 1400 atmospheres and the vessel maintained at 20° C. A rapid reaction took place at a rate corresponding to about 20% conversion in the first hour. On opening the vessel a white solid polymer of ethylene was extracted which had the following properties:

| | |
|---|---|
| Density _____gm./cc__ | 0.951 |
| Yield stress_____lbs./sq. inch__ | 3450 |

| | | |
|---|---|---|
| Bending modulus | lbs./sq. inch | 80,000 |
| Grade number (melt index) | | 1.5 |
| Vicat softening point | ° C | 120 |

*Example 12*

In this experiment the conditions were the same as those in Example 11 except that carton tetrachloride was used as chain-transfer agent in place of hydrogen, the proportion being about 0.10% by weight of the ethylene. The solid polymer produced had the following properties:

| | | |
|---|---|---|
| Density | gm./cc | 0.952 |
| Yield stress | kg./cm.$^2$ | 241 |
| Bending modulus | lbs./sq. inch | 82,000 |
| Grade number (melt index) | | 0.84 |

What we claim is:

1. Process for the manufacture of solid polymers of ethylene having densities greater than 0.925 grammes per cubic centimetre which comprises subjecting gaseous ethylene to a pressure greater than 500 atmospheres and to a temperature less than 150° C., in the presence of an α-substituted acyl peroxide polymerization catalyst and of a chain-transfer agent in amount sufficient only to effect chain transfer and in the absence of any significant amount of added liquid medium whereby said process is carried out under essentially liquid-free conditions.

2. Process as claimed in claim 1 in which the pressure is between 1000 and about 2000 atmospheres, and the temperature between about 20° and 60° C. and the catalyst is an α-substituted acyl peroxide and the chain-transfer agent is hydrogen in an amount equivalent to between 0.5% and 2.5% by volume of the ethylene measured at atmospheric pressure.

3. Process as claimed in claim 1 in which the pressure is between 1000 and 2000 atmospheres, and the temperature between 20° and 60° C., and the catalyst is an α-substituted acyl peroxide, and the chain-transfer agent is carbon tetrachloride in an amount equivalent to between 0.05% and 1.0% by weight of the ethylene.

4. Process as claimed in claim 2 in which the catalyst is di-pivalyl peroxide (bis-trimethyl acetyl peroxide).

5. Process as claimed in claim 2 in which the catalyst is di-isobutyryl peroxide.

6. Process as claimed in claim 3 in which the catalyst is di-pivalyl peroxide (bis-trimethyl acetyl peroxide).

7. Process as claimed in claim 3 in which the catalyst is di-isobutyryl peroxide.

References Cited in the file of this patent

UNITED STATES PATENTS

| | | |
|---|---|---|
| 2,402,137 | Hanford | June 18, 1946 |
| 2,471,959 | Hunt | May 31, 1949 |
| 2,475,643 | Seebold | July 12, 1949 |
| 2,559,630 | Bullitt | July 10, 1951 |